US008281235B1

(12) United States Patent
Nickull

(10) Patent No.: US 8,281,235 B1
(45) Date of Patent: Oct. 2, 2012

(54) TRANSFORMATION OF STRUCTURED FILES

(75) Inventor: Duane Nickull, Vancouver (CA)

(73) Assignee: Adobe Systems Incorporated, San Jose, CA (US)

( * ) Notice: Subject to any disclaimer, the term of this patent is extended or adjusted under 35 U.S.C. 154(b) by 1170 days.

(21) Appl. No.: 12/104,312

(22) Filed: Apr. 16, 2008

(51) Int. Cl.
*G06F 17/00* (2006.01)
(52) U.S. Cl. ....................................... 715/236
(58) Field of Classification Search ............ 715/234, 715/235, 236, 237, 239
See application file for complete search history.

(56) References Cited

U.S. PATENT DOCUMENTS

| 5,694,609 A * | 12/1997 | Murata .................... 715/210 |
| 6,009,436 A * | 12/1999 | Motoyama et al. .................. 1/1 |
| 6,292,830 B1 * | 9/2001 | Taylor et al. ................. 709/224 |
| 7,284,239 B1 | 10/2007 | Young et al. |
| 7,313,757 B2 | 12/2007 | Bradley et al. |
| 2002/0184264 A1 * | 12/2002 | Berg et al. ..................... 707/513 |
| 2004/0167864 A1 * | 8/2004 | Wang et al. ...................... 707/1 |
| 2004/0205452 A1 * | 10/2004 | Fitzsimons et al. ........... 715/500 |
| 2005/0165724 A1 * | 7/2005 | West ................................. 707/1 |
| 2005/0273593 A1 * | 12/2005 | Seminaro et al. ............. 713/151 |
| 2006/0195783 A1 * | 8/2006 | Davis et al. ................... 715/513 |
| 2007/0233736 A1 * | 10/2007 | Xiong et al. ............... 707/104.1 |
| 2007/0277094 A1 * | 11/2007 | Majidian ....................... 715/513 |

OTHER PUBLICATIONS

Bailey, James, et al, "An Event-Condition-Action Language for XML", WWW'02: Proceedings of the 11th International Conference on World Wide Web, May 2002, pp. 486-495.*

* cited by examiner

*Primary Examiner* — Laurie Ries
(74) *Attorney, Agent, or Firm* — Schwegman Lundberg Woessner P.A.

(57) ABSTRACT

A method of transforming a structured file is provided. A transformation instruction is loaded in a memory and the transformation instruction defines an event. The structured file is parsed into a parsing event and this parsing event is compared with the event defined by a transformation instruction. Based on the parsing event matching the event defined by the transformation instruction, the transformation instruction associated with the event is selected from the memory and the transformation instruction is executed to transform the structured file.

18 Claims, 7 Drawing Sheets

TRANSFORMATION OF STRUCTURED FILES

FIELD

The present disclosure relates generally to data transformation. In an example embodiment, the disclosure relates to the transformation of structured files.

BACKGROUND

A structured file (e.g., an eXtensible Markup Language (XML) document) may be transformed or manipulated to satisfy a variety of objectives. For example, a structured file may be transformed into a different format. Currently, many transformation engines load a complete structured file into memory and map the structured file into an internal tree structure, which may be embodied within a Document Object Model (DOM). A transformation engine needs to navigate through the tree structure to transform the structured file.

A tree structure is typically larger in size and than information for source or subset needed for the transformation, and may therefore occupy a large amount of memory than necessary. Therefore, the processing and storage of a tree structure may exert a great strain on system resources, especially when the structured file is large. Furthermore, many applications need to build their own custom tree structures, rather than using a generic tree structure. Here, a generic tree structure is initially built and then mapped to a different custom tree structure. The generic tree may then be discarded. The operations of building the entire tree structure and then discarding it after mapping waste system resources and slow the transformation process.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

The example embodiments described herein provide various techniques for transforming structured files. Generally, as will be explained in more detail below, a small set of transformation instructions are stored or held in memory. A structured file is parsed into a series of parsing events and each parsing event is compared with events defined by the transformation instructions stored in memory. If no match of an incoming parsing event with the events is identified, then this parsing event is quickly dropped from the memory, thereby reducing the memory footprint at an early stage in the transformation process.

Figure 1:
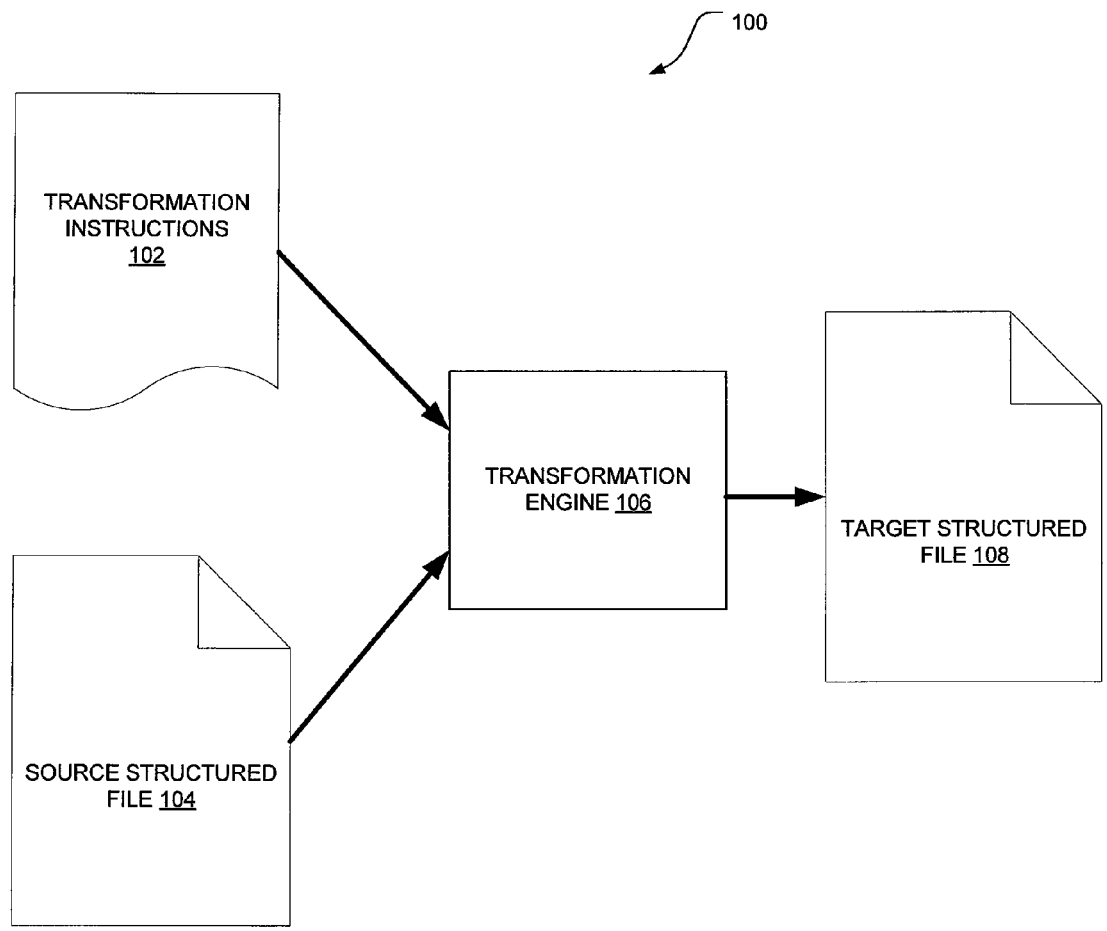
FIG. 1 is a block diagram of a transformation of a source structured file to a target structured file, in accordance with an example embodiment.

FIG. 1 is a block diagram of a transformation of a source structured file 104 to a target structured file 108, in accordance with an example embodiment. In general, a structured file, such as source structured file 104 or target structured file 108, is a collection of related data where the data is organized in a systematic framework. In effect, the data included in a structured file has form. In an example, the data included in the structured file is human readable. Examples of a structured file can include a single or multiple files that are accessible by and/or associated with electronic document processing applications such as word processing applications, document viewers, email applications, presentation applications, spreadsheet applications, diagramming applications, graphic editors, graphic viewers, and other applications. For example, structured files may include page description language files (e.g., Adobe Portable Document Format (PDF), XML Paper Specification (XPS), and other description language files), Microsoft DOC files, Hypertext Markup Language (HTML) files, eXtensible Markup Language (XML) files, Electronic Data Interchange (EDI) files, Microsoft XLS files, comma-separated values (CSV) files, and other structured files.

The source structured file 104 may be transformed for a variety of different purposes. For example, source structured file 104 may be transformed into a different format. In this example, source structured file 104 may be in XML format and may be transformed into target structured file 108 that is in HTML format. In another example, source structured file 104 may be transformed to convert data between different schemas, such as between various XML schemas. In yet another example, a transformation operation may include querying particular data included in source structured file 104.

As depicted in FIG. 1, transformation engine 106 is configured to transform source structured file 104 into target structured file 108 based on transformation instructions 102. The source structured file 104 is a structured file before transformation and parsing, which is explained in more detail below. On the other hand, target structured file 108 is a structured file after transformation. In the example of FIG. 1, source structured file 104 is not modified. Instead, transformation engine 106 creates a new target structured file 108 based on source structured file 104 and transformation instructions 102. The transformation instructions 102 describe rules for transforming structured files. Such transformation instructions 102 provide the syntax to transform source structured file 104 to target structured file 108. For example, transformation instructions 102 may be a set of keys to transform source structured file 104 into target structured file 108. Examples of transformation languages 102 include eXtensible Stylesheet Language Transformations (XSLT), XQuery, Turing eXtender Language (TXL), Streaming Transformations for XML (STX), Functional XML Transformation Tool (FXT), Scala (Scalable Language), XStream, and other transformation languages.

Figure 2:
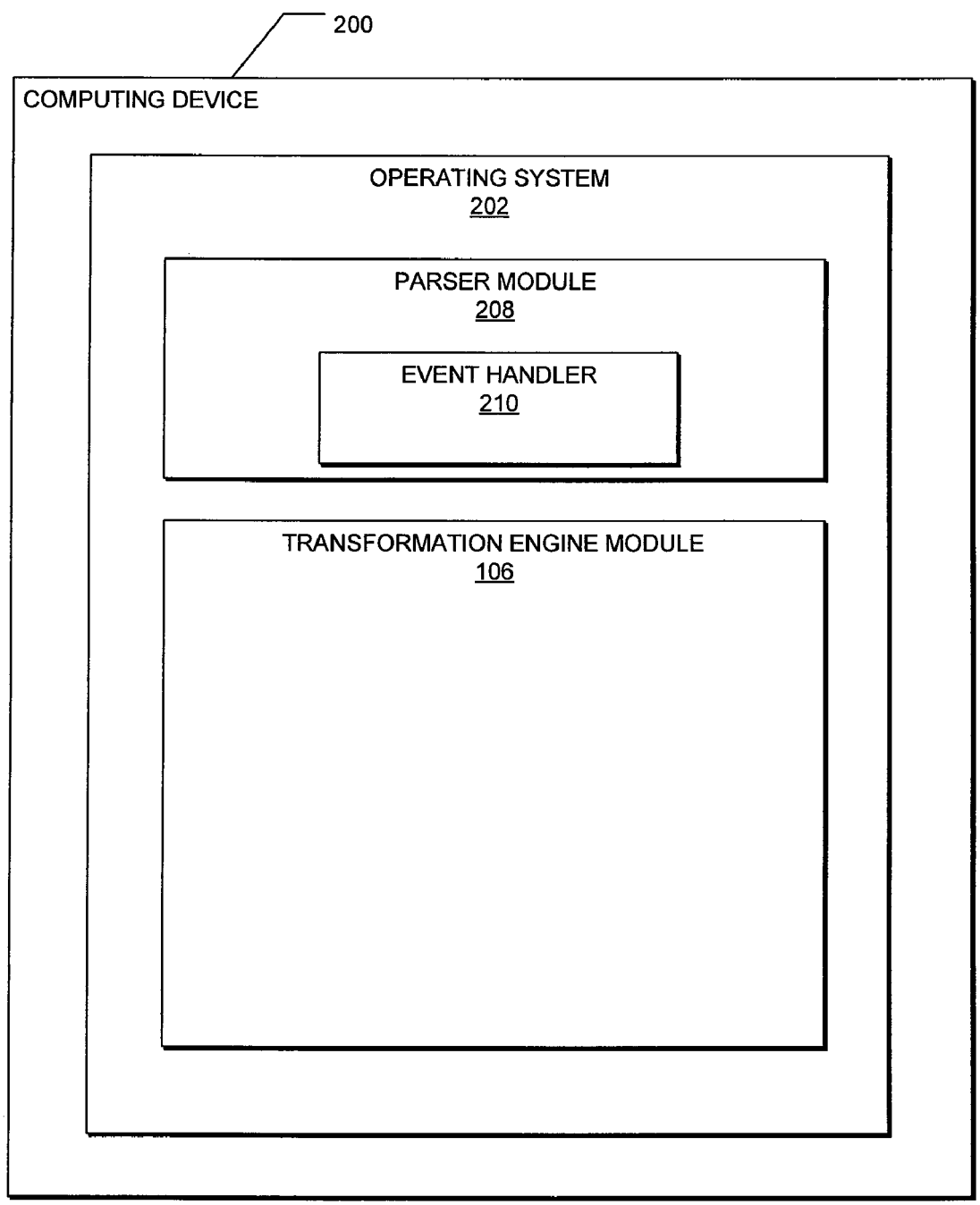
FIG. 2 is a block diagram of a parser module and transformation engine module included in computing device, in accordance with an example embodiment.

FIG. 2 is a block diagram of a parser module 208 and a transformation engine module 106 included in computing device 200, in accordance with an example embodiment. Computing device 200 includes operating system 202 that manages the software processes and/or services executing on the computing device. As shown in FIG. 2, these software processes and/or services may include parser module 208 and transformation engine module 106 (or transformation engine). It should be appreciated that computing device 200 may be deployed in the form of a variety of computing devices, such as computers, Personal Digital Assistants (PDA), cellular telephones, and other computing devices. In various example embodiments, computing device 200 may be used to implement computer programs, logic, applications, methods, processes, or other software to parse and transform structured files, as described in more detail below.

The parser module 208 is configured to parse a structured file into events or parsing events. As will be explained in more detail below, parsing may be the interpretation of a one dimensional stream of data into events. The parser module 208 may be a streaming interface that is configured to parse a portion of a structured file at a time. In effect, parser module 208 may be a serial or stream parser. For example, parser module 208 receives or is provided with a structured file in a continuous stream and parses the portion of the structured file included in the continuous stream. As such, parser module 208 may not load the entire structured file into a memory. An example of parser module 208 is a Simple Application Programming Interface for XML (SAX) parser. As will be explained in more detail below, parser module 208 may dynamically create event handler 210 to intercept and to filter parsed events.

Transformation engine module 106 is configured to transform one or more structured files. As explained in more detail below, transformation engine module 106 may create a representation of the transformation instructions in memory. The transformation engine module 106 is in communication with parser module 208 and may execute particular transformation instructions that are associated with incoming events (or signaled events) from the parser module. Examples of transformation engine module 106 include XSLT engines, sequential eXtensible markup language processing and transformation engines, and other transformation engines.

It should be appreciated that in other example embodiments, computing device 200 may include fewer or more modules apart from those shown in FIG. 2. For example, event handler 210 may be separated from parser module 208 to form two modules. In another example, parser module 208 may be integrated into transformation engine module 106.

Figure 3:
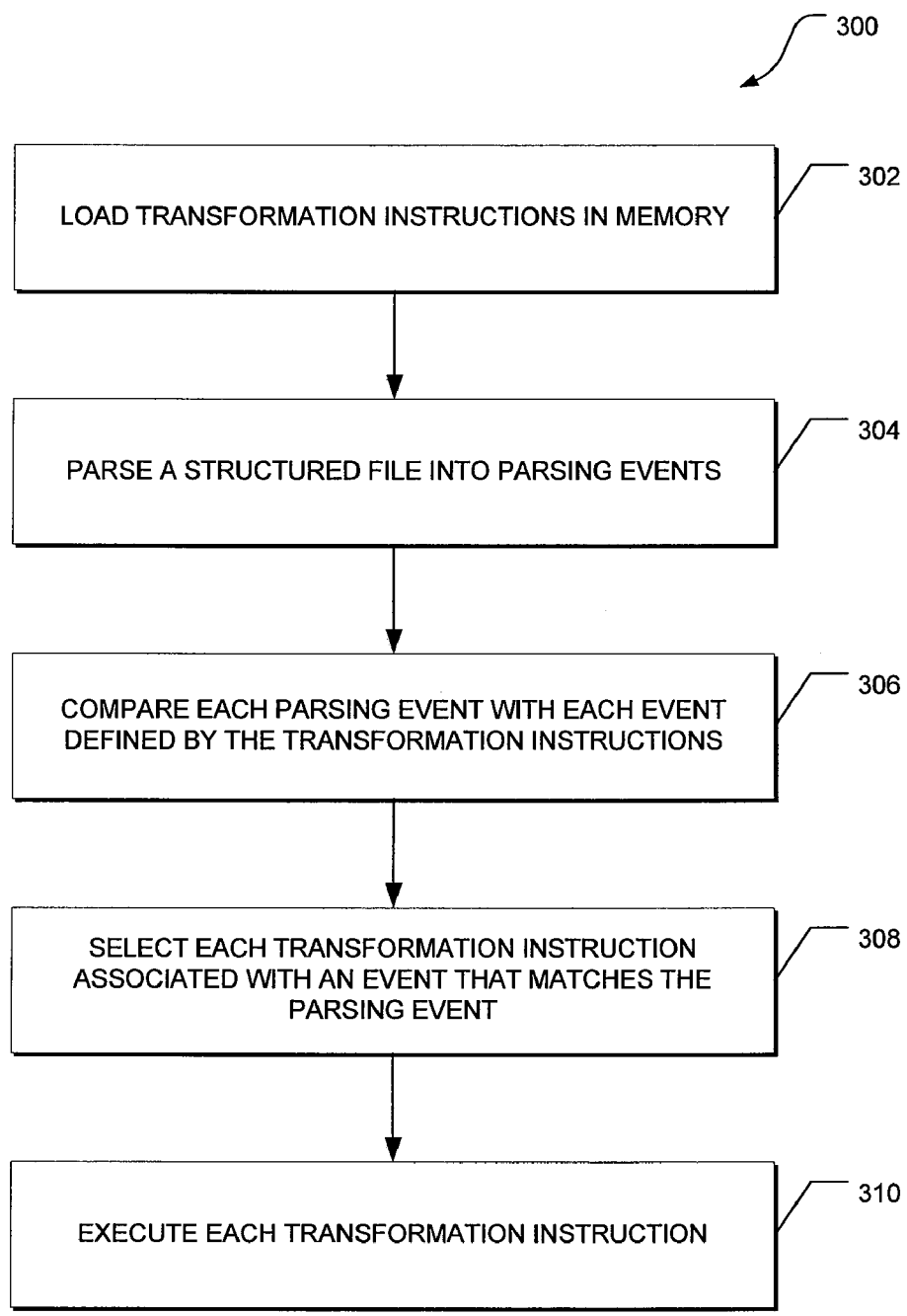
FIG. 3 is a flow diagram of a general overview of a method, in accordance with an example embodiment, for transforming a structured file.

FIG. 3 is a flow diagram of a general overview of a method 300, in accordance with an example embodiment, for transforming a structured file. In an example embodiment, method 300 may be implemented by parser module 208 and transformation engine module 106 of FIG. 2 and employed in computing device 200. As depicted in FIG. 3, transformation instructions are loaded in memory. The transformation instructions may be loaded in a variety of memories. In an example embodiment, the memory may be a volatile memory. A computing device may use the volatile memory as a main memory to temporarily store data. Examples of volatile memories may include random access memories (RAM), such as dynamic RAM (DRAM), static RAM (SRAM), and other RAM.

A structured file is then parsed at 304 into events or parsing events. A parsing event may refer to an event resulting from a parsing operation. As used herein, it should be noted that the terms "parsing events" and "events" may be used interchangeably. As noted briefly above, parsing may be the interpretation of a one dimensional stream of data into events. Events are the resultant output of a parsing operation. Examples of events may include nodes (e.g., text nodes, element nodes, and other nodes), instructions, comments, and other events. A Simple Application Programming Interface for XML (SAX) event is an example of a type of event. In an example embodiment, the complete structured file may be loaded in memory and parsed. In another example embodiment, the structured file may be parsed serially or sequentially. In serial parsing, instead of loading the complete or entire structured file into the memory for parsing, a portion of the structured file is loaded into memory and parsed into one or more parsing events. Therefore, in effect, a portion of the structured file is read and parsed at a time. The following Table A is an example of an XML file parsed into multiple parsing events.

TABLE A

| Structured File | Parsing Events |
| --- | --- |
| <?xml version ="1.0"?> | start document |
| <doc> | start element: doc |
| <para>Hello, world!</para> | start element: para |
| </doc> | characters: Hello, world! |
| | end element: para |
| | end element: doc |
| | end document |

The above Table A shows an XML file parsed into a series of parsing events, such as XML element start, XML text nodes, and XML element ends. Here, portions of the XML file are read (or loaded into the memory) and parsed. For example, the portion "<?xml version="1.0"?>" can be initially read from the XML file and parsed into a "start document" parsing event. The portion "<doc>" is next read from the XML file and parsed into a "start element: doc" parsing event. In sequence, the portion "<para>Hello, world!</para>" is read thereafter and parsed into parsing events "start element: para," "characters: Hello, world!," and "end element: para." Finally, the portion "</doc>" is read and thereafter parsed into parsing events "end element: doc" and "end document."

In an example embodiment, the transformation instructions are configured to define associated parsing events. For example, a transformation instruction may define or specify a particular parsing event that is associated with itself. The respective parsing event may be included within the transformation instruction. When the transformation instructions are loaded in the memory, their respective events are also retrieved from the transformation instructions. With the events extracted from the transformation instructions, each parsing event resulting from a parsing operation is compared with each event defined by the transformation instructions at 306. For example, each parsing event may be compared with a list or an array of events defined by the transformation instructions. Thereafter, each transformation instruction associated with an event that matches a parsing event is selected from the memory at 308 and executed at 310. The transformation instruction is executed to perform a transformation operation that transforms a portion of or an entire structured file. As will be explained in more detail below, parsing events that do not match (or is distinct from) any events defined by the transformation instructions are removed or dropped from memory.

Figure 4:
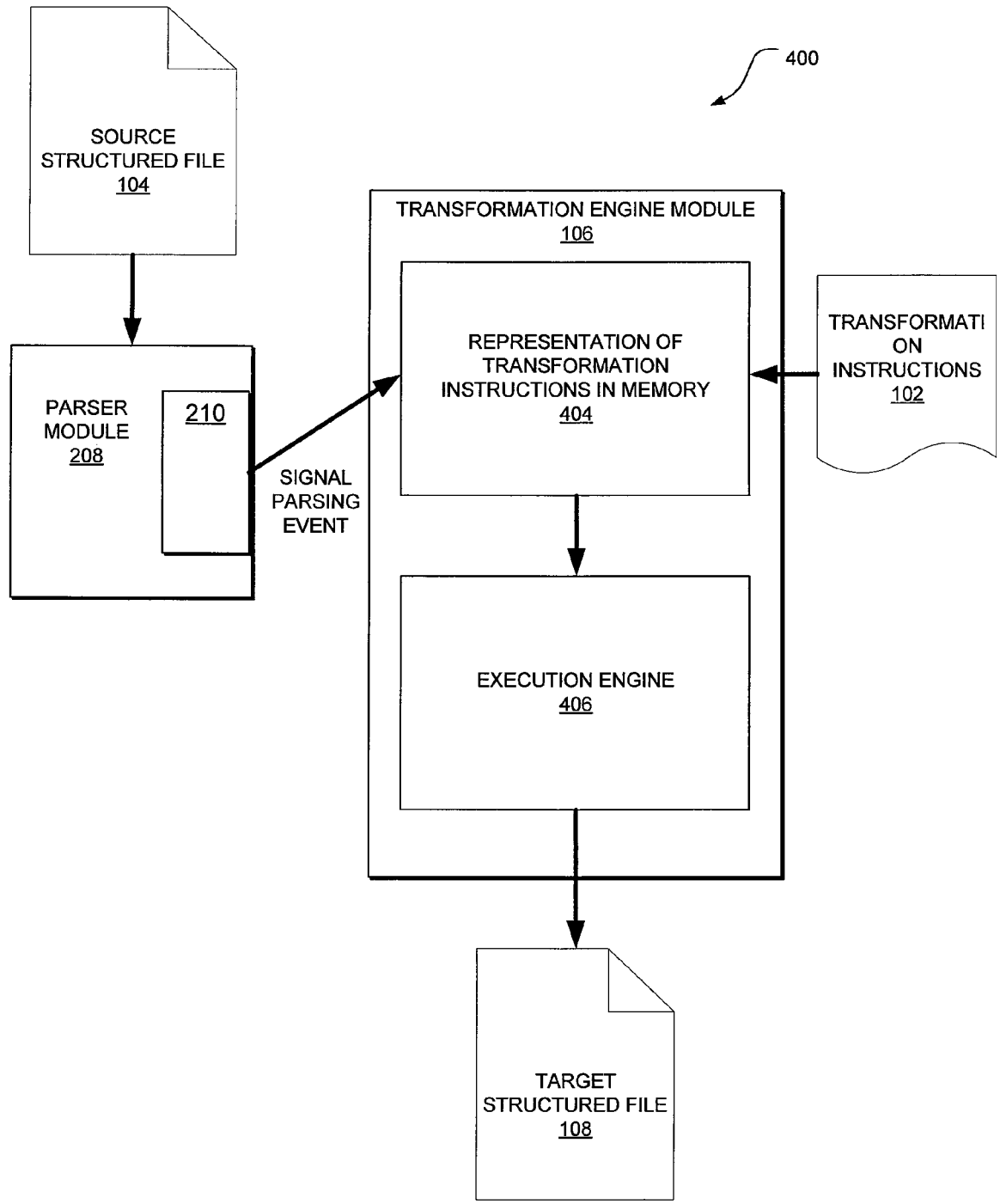
FIG. 4 is a block diagram of detailed methods, in accordance with an example embodiment, for transforming a source structured file into a target structured file.

FIG. 4 is a block diagram of detailed methods, in accordance with an example embodiment, for transforming a source structured file 104 into a target structured file 108. As depicted in FIG. 4, system 400 includes parser module 208 in communication with transformation engine module 106. A source structured file 104 is transformed into a target structured file 108 based on transformation instructions 102. Initially, transformation engine module 106 reads transformation instructions 102 and loads the transformation instructions in memory. In effect, transformation engine module 106 creates a representation 404 of transformation instructions 102 in the memory. In an example, transformation engine module 106 may load transformation instructions 102 by declaring the transformation instructions in memory such that the transformation instructions are in declarative form.

The transformation instructions 102 also define associated events that may trigger the execution of the transformation instructions. The transformation engine module 106 reads the events from transformation instructions 102 and provides the defined events to parser module 208. It should be appreciated the events defined by transformation instructions 102 may not all be actionable or warrant execution of their respective transformation instructions. The timing of the execution of each transformation instruction may be variable. Accordingly, transformation engine module 106 is configured to continuously update and provide a list of active events, where the associated transformation instructions 102 are ready for immediate execution, to parser module 208. As used herein, it should be noted that the terms "active events" and "events" may be used interchangeably.

In turn, parser module 208 may create event handler 210 to handle the receipt of the events. The event handler 210 is created based on the events provided by transformation engine module 106. Parser module 208 creates event hander 210 when events are provided. Without events, parser module 208 removes or does not create event handler 210. Accordingly, the creation of event handler 210 may be dynamic. Here, parser module 208 initially reads a portion of source structured file 104 and parses this portion into one or more parsing events. In general, event handler 210 is an application that is configured to filter the parsing events. For example, event handler 210 may intercept the parsing events destined for transformation engine module 106 and may compare each parsing event with a list or an array of actionable events provided by the transformation engine module.

The event handler 210 may use a variety of comparison techniques to identify a match of a parsing event with an actionable event defined by transformation instructions 102. If event handler 210 cannot find a match, then the event handler removes or drops the parsing event from memory. The removal of the parsing event from the memory reduces the memory footprint, thereby resulting in less memory being used to store the events. On the other hand, if event handler 210 identifies a parsing event to match an event in the list of actionable events, then the event handler signals transformation engine module 106 that an actionable event is received. Event handler 210 may signal transformation engine module 106 using a variety of signaling techniques, such as transmitting the parsing event to the transformation engine module. In another example, event handler 210 may signal transformation engine module 106 by transmitting an event identifier, which identifies the event, to the transformation engine module. Alternatively, signaling may also include transformation engine module 106 reading or pulling the parsing event from parser module 208. It should be appreciated that event handler 210 compares and identifies events before the parsing event is signaled to transformation engine module 106.

Transformation engine module 106 detects receipt of a particular actionable event from parser module 208. In effect, transformation engine module 106 receives (or pulls) signals from event handler 210 (or parser module 208) that a particular actionable event is parsed from source structured file 104. As a result, transformation engine module 106 selects or retrieves a transformation instruction that is associated with the particular actionable event. This transformation instruction is selected from representation 404 in memory and is thereafter provided to execution engine 406 for execution. The output of execution engine 406 is a transformation operation that transforms a portion of or the entire source structured file 104 into target structured file 108.

Figure 5A:
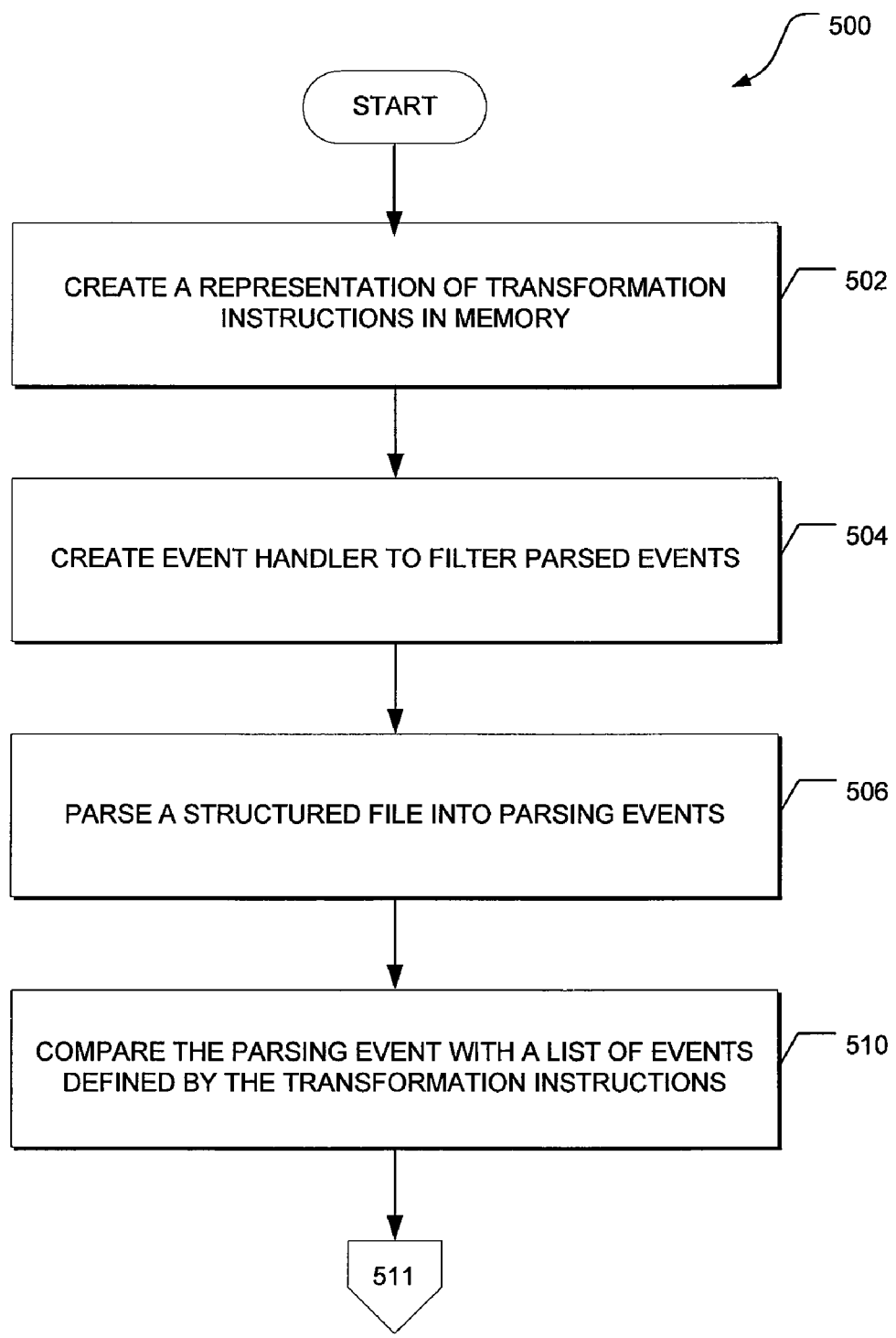
FIG. 5A and FIG. 5B are portions of a flow diagram of detailed methods, in accordance with an example embodiment, for transforming a structured file.
Figure 5B:
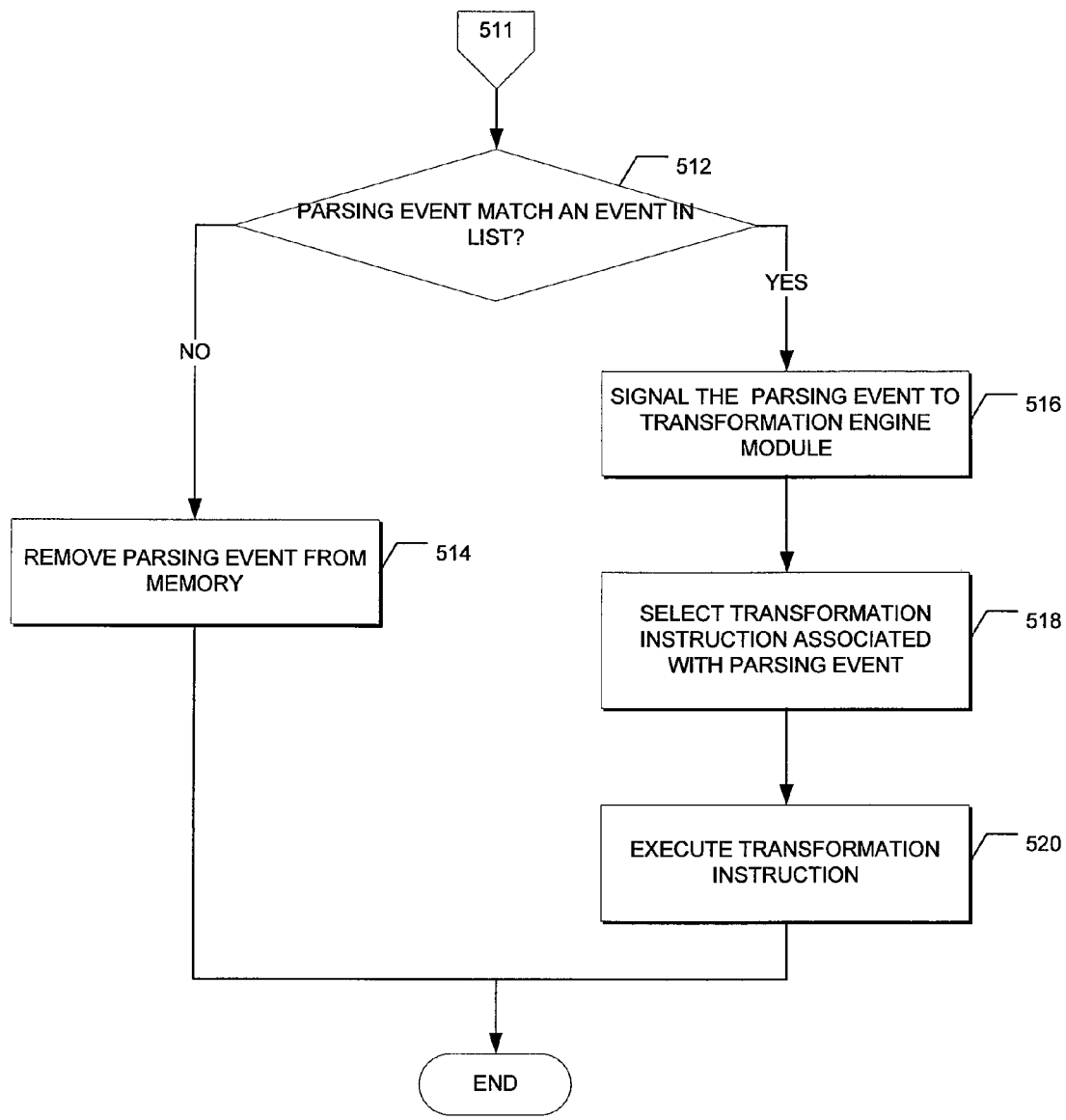

FIG. 5A and FIG. 5B are portions of a flow diagram of detailed methods, in accordance with an example embodiment, for transforming a structured file. In an example embodiment, method 500 may be implemented by parser module 208 and transformation engine module 106 of FIG. 2 and employed in computing device 200. As depicted in FIG. 5A, a representation of transformation instructions is created in memory at 502. The representation may be created by declaring the transformation instructions in the memory. The transformation instructions may define associated events and the associated events are read or retrieved from the transformation instructions. An event handler may then be created at 504 to filter parsed events based on a list of the actionable events defined by the transformation instructions.

The structured file is then parsed at 506 into parsing events. The parsing events are provided to the event handler and the event handler compares each parsing event with actionable events defined by the transformation instructions. For example, each parsing event is compared with a list of events at 510 provided by a transformation engine module. Referring to FIG. 5B, starting at 511, a determination is made as to whether each parsing event matches an actionable event from the list at 512. If a parsing event is distinct or does not match any actionable events, then event handler removes the parsing event from memory at 514. Accordingly, the size of memory reserved to store events may be reduced.

On the other hand, if a parsing event matches an actionable event from the list, then the event handler signals this parsing event to the transformation engine module at 516. The transformation engine module detects the receipt of the parsing event from the parser module and selects a transformation instruction associated with the parsing or actionable event at 518 from memory. The transformation instruction is then executed at 520 to transform the entire or a portion of the structured file. Once the structured file is completely parsed and filtered, the transformation engine module may remove the representation of the transformation instructions from the memory.

Figure 6:
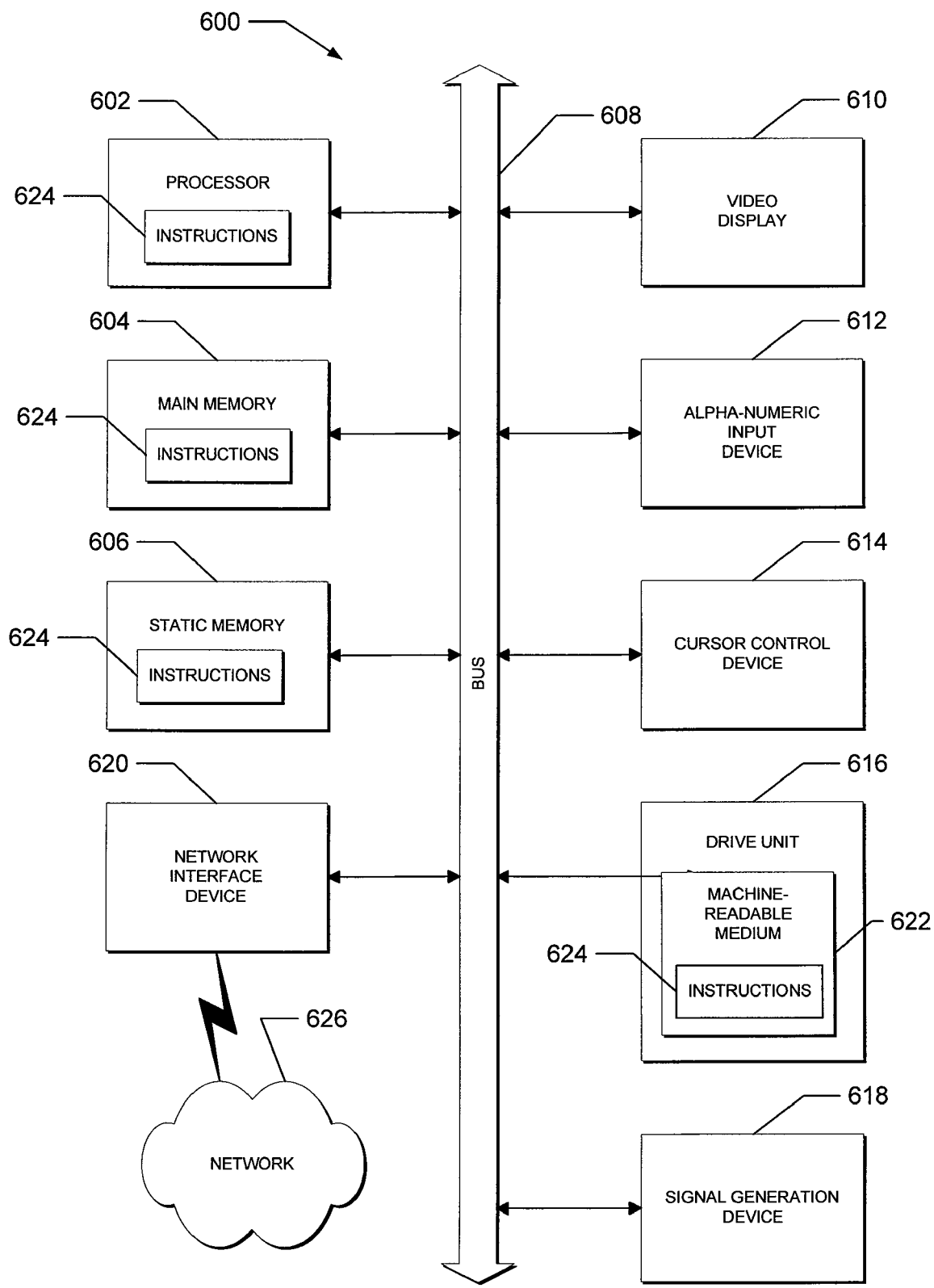
FIG. 6 is a block diagram of a machine in the example form of computer system within which a set of instructions, for causing the machine to perform any one or more of the methodologies discussed herein, may be executed.

FIG. 6 is a block diagram of a machine in the example form of computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels. The machine may be a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes processor 602 (e.g., a central processing unit (CPU), a graphics processing unit (GPU) or both), main memory 604 and static memory 606, which communicate with each other via bus 608. Computer system 600 may further include video display unit 610 (e.g., a plasma display, a liquid crystal display (LCD) or a cathode ray tube (CRT)). Computer system 600 also includes alphanumeric input device 612 (e.g., a keyboard), user interface (UI) navigation device 614 (e.g., a mouse), disk drive unit 616, signal generation device 618 (e.g., a speaker) and network interface device 620.

Disk drive unit 616 includes machine-readable medium 622 on which is stored one or more sets of instructions and data structures (e.g., software 624) embodying or utilized by any one or more of the methodologies or functions described herein. Software 624 may also reside, completely or at least partially, within main memory 604 and/or within processor 602 during execution thereof by computer system 600, main memory 604 and processor 602 also constituting machine-readable, tangible media.

Software 624 may further be transmitted or received over network 626 via network interface device 620 utilizing any one of a number of well-known transfer protocols (e.g., HTTP).

While machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for transforming structured files may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of transforming a structured file, the method comprising:
    loading a transformation instruction in a memory, the transformation instruction defining an event;
    parsing the structured file into a parsing event;
    comparing the parsing event with the event defined by the transformation instruction;
    selecting the transformation instruction associated with the event from the memory based on the parsing event matching the event defined by the transformation instruction;
    removing the parsing event from the memory when the parsing event is distinct from the event defined by the transformation instruction; and
    executing the transformation instruction to transform the structured file.

2. The method of claim 1, wherein the loading of the transformation instruction includes declaring the transformation instruction in the memory.

3. The method of claim 1, wherein a portion of the structured file is parsed into the parsing event.

4. The method of claim 1, comprising identifying the parsing event to match the event defined by the transformation instruction before the selecting of the transformation instruction.

5. The method of claim 1, wherein the structured file is an eXtensible Markup Language (XML) file.

6. The method of claim 1, wherein the structured file is a page description language file.

7. A non-transitory, machine-readable medium that stores instructions, which when performed by a machine, cause the machine to perform operations comprising:
    creating a representation of a plurality of transformation instructions in a volatile memory, each transformation instruction in the plurality of transformation instructions defining a respective event;
    parsing a source eXtensible Markup Language (XML) file into a plurality of parsing events;
    comparing a parsing event from the plurality of parsing events with each event defined by the plurality of transformation instructions;
    if the parsing event matches an event defined by a transformation instruction from the plurality of transformation instructions, selecting the transformation instruction associated with the event from the volatile memory and executing the transformation instruction to transform the source XML file to a target structured file; and
    if the parsing event is distinct from the plurality of events defined by the plurality of transformation instructions, removing the parsing event from the volatile memory.

8. The non-transitory, machine-readable medium of claim 7, comprising creating an event handler, the event handler being configured to compare the parsing event and to remove the parsing event from the volatile memory.

9. The non-transitory, machine-readable medium of claim 7, wherein a portion of the XML file is parsed into the plurality of parsing events.

10. The non-transitory, machine-readable medium of claim 7, comprising identifying the parsing event to match the event defined by the transformation instruction from the plurality of transformation instructions before the selecting of the transformation instruction.

11. The non-transitory, machine-readable medium of claim 7, wherein the parsing event is a Simple Application Programming Interface for XML (SAX) event.

12. A computing device, comprising:
    at least one processor; and
    a memory in communication with the at least one processor, the memory being configured to store a parser module and a transformation engine module that are executable by the at least one processor,
        the transformation engine module being executed by the at least one processor to cause loading a plurality of transformation instructions in the memory, each transformation instruction in the plurality of transformation instructions defining a respective event,
        the parser module being executed by the at least one processor to cause:
            parsing a structured file into a plurality of parsing events;
            intercepting the plurality of the parsing events destined for the transformation engine module;
            comparing a parsing event in the plurality of parsing events with each event defined by the plurality of transformation instructions;
            signaling the parsing event to the transformation engine module based on the parsing event matching an event defined in a transformation instruction from the plurality of transformation instructions; and
            removing the parsing event from the memory based on the parsing event being distinct from a plurality of events defined by the plurality of transformation instructions.

13. The computing device of claim 12, wherein when the parser module is executed by the at least one processor to cause identifying the parsing event to match the event defined by the transformation instruction from the plurality of transformation instructions before the parsing event is signaled to the transformation engine module.

14. The computing device of claim 12, wherein the parser module is a Simple Application Programming Interface for eXtensible Markup Language (SAX) parser.

15. The computing device of claim 12, wherein the transformation engine module is a sequential eXtensible markup language processing and transformation engine.

16. The computing device of claim 12, wherein the parser module is executed by the at least one processor to cause creating an event handler, the event handler to intercept the stream of the plurality of parsing events and to compare the parsing event in the plurality of parsing events with each event defined by the plurality of transformation instructions.

17. The computing device of claim 16, wherein the event handler is created dynamically based on the plurality of transformation instructions loaded in the memory.

18. The computing device of claim 12, wherein when the transformation engine is executed by the at least one processor to cause:
    detecting receipt of the parsing event from the parser module;
    selecting the transformation instruction in the plurality of transformation instructions that is associated with the parsing event; and
    executing the transformation instruction to transform the structured file.

* * * * *